United States Patent [19]

Kasugai et al.

[11] Patent Number: 4,785,961
[45] Date of Patent: Nov. 22, 1988

[54] CAP WITH VALVE

[75] Inventors: Joji Kasugai, Ichinomiya; Satoshi Toki, Inazawa; Masayuki Ide, Toyota; Makoto Miura, Owariasahi, all of Japan

[73] Assignees: Toyoda Gosei Co., Ltd., Nishikasugai; Toyota Jidosha Kabushiki Kaisha, Toyota, both of Japan

[21] Appl. No.: 137,780

[22] Filed: Dec. 24, 1987

[30] Foreign Application Priority Data

Dec. 26, 1986 [JP] Japan .................. 61-313584

[51] Int. Cl.⁴ .............................. B65D 41/04
[52] U.S. Cl. ...................... 220/203; 220/204; 220/DIG. 33; 220/303
[58] Field of Search ............ 220/203, 204, 303, 304, 220/209, DIG. 32, DIG. 33; 137/493.9, 469

[56] References Cited

U.S. PATENT DOCUMENTS

| 4,051,975 | 10/1977 | Ohgida et al. |         |
|-----------|---------|---------------|---------|
| 4,102,472 | 7/1978  | Sloan, Jr.    |         |
| 4,294,376 | 10/1981 | Keller        |         |
| 4,494,673 | 1/1985  | Hiraishi      |         |
| 4,540,103 | 9/1985  | Kasugai et al.|         |
| 4,572,396 | 2/1986  | Kasugai et al.| 220/203 |
| 4,588,102 | 5/1986  | Kasugai       | 220/203 |
| 4,666,056 | 5/1987  | Kasugai et al.| 220/203 |
| 4,676,390 | 6/1987  | Harris        | 220/203 |
| 4,716,920 | 1/1988  | Crute         | 137/39  |
| 4,724,868 | 2/1988  | Kasugai et al.|         |
| 4,726,488 | 2/1988  | Kasugai et al.| 220/203 |

Primary Examiner—George T. Hall
Attorney, Agent, or Firm—Cushman, Darby & Cushman

[57] ABSTRACT

In a cap with valve, an annular projection is formed at an inner circumference of a fluid flow path of a cap body to be installed at an opening portion of a container. A valve body is an annular body and provided with an inner circumferential lip element projecting upward at inner circumferential edge and an outer circumferential lip element projecting downward at outer circumferential edge, and the outer circumferential lip element abuts on the annular projection of the cap body. A first disk-shaped support plate is arranged at upper side of the valve body and provided with a support member supporting the upper surface side of the outer circumferential lip element. The first support plate is biased downward by a first spring means from upper side. A second support plate is arranged at lower side of the valve body and provided with a support member supporting the lower surface side of the inner circumferential lip element and with a fluid flowing hole at the center. The second support plate is biased upward by a second spring means. The first support plate is provided with a fluid flowing hole penetrating vertically between the support member and the seal member on which the inner circumferential lip element of the valve body abuts.

4 Claims, 7 Drawing Sheets

CAP WITH VALVE

BACKGROUND OF THE INVENTION

1. Field of the Invention

The present invention relates to a cap with valve, such as a fuel cap or a radiator cap for automobiles, which is installed to an aperture of a container such as a fuel tank or a radiator and adjusts pressure in the container by flowing fluid such as air out of the container or into the container from outside when the pressure in the container is positive or negative.

2. Description of the Prior Art

In the prior art, such cap with valve, for example, a fuel cap to be installed to a filler neck of automobiles (hereinafter referred to simply as "cap"), depending on difference of shape of a lip element in the valve body, the valves are classified into two sorts as shown in FIG. 1 and FIG. 2 (refer to Japanese patent publication No. 52-45924, Utility model publication No. 58-47002, Utility model application laid-open No. 60-179654).

In an annular valve body 3 in a cap 1 shown in FIG. 1, its inner circumferential lip element 3a and outer circumferential lip element 3b are projected in reverse directions to each other. Also in an annular valve body 13 in a cap 11 shown in FIG. 2, its inner circumferential lip element 13a and outer circumferential lip element 13b in the same direction.

In the cap 1, at normal state, the outer circumferential lip element 3b together with a first annular support plate 4 is biased downward by a first coil spring 6 and pressed against an annular projection 2b of a cap body 2. Also the inner circumferential lip element 3a together with a second annular support plate 5 is biased upward by a second coil spring 7 and pressed against a bottom portion 8b of a spring shoe plate 8. That is, these lip elements 3a, 3b are pressed at prescribed position so as to close a fluid flow path 2a of the cap body 2. When pressure in the fuel tank becomes positive pressure over prescribed valve, the outer circumferential lip element 3b is bent about a thin portion 3c of the valve body 3 as fulcrum and elevated together with the first support plate 4 against the biasing force of the first coil spring 6 and separated from the annular projection 2b of the cap body 2. Thus the positive pressure state in the fuel tank is eliminated through a gap between the outer circumferential lip element 3b and the annular projection 2b. Also when the pressure in the fuel tank becomes negative pressure over prescribed value, the inner circumferential lip element 3a is bent about the thin portion 3c as fulcrum and lowered together with the second support plate 5 against the biasing force of the second coil spring 7 and separated from the bottom portion 8b of the spring shoe plate 8. Thus the negative pressure state in the fuel tank is eliminated through a gap between the inner circumferential lip element 3a and the bottom portion 8b of the spring shoe plate 8.

Also in the cap 11, at normal state, the outer lip element 13b together with an annular support plate 14 is biased downward by a first coil spring 16 and pressed against an annular projection 12b of a cap body 12. Also the inner circumferential lip element 13a pressed against a disk shaped valve plate 18 biased upward by a second coil spring 17. That is, these lip elements 13a, 13b are pressed at prescribed position so as to close a fluid flow path 12a of the cap body 12. When pressure in the fuel tank becomes positive pressure over prescribed value, the outer circumferential lip element 13b together with the support plate 14 is elevated against the biasing force of the first coil spring 16 and separated from the annular projection 12b of the cap body 12. Thus the positive pressure state in the fuel tank is eliminated through a gap between the outer circumferntial lip element 13b and the annular projection 12b. Also when the pressure in the fuel tank becomes negative pressure over prescribed value, the valve plate 18 is lowerd against the biasing forece of the second coil spring 17 and separated from the innter circumferential lip element 13a. Thus the negative pressure state in the fuel tank is eliminated through a gap between the inner circumferential lip element 13a and the valve plate 18. Numeral 10 designates a filler neck.

In such caps 1, 11 in the prior art, seal surface pressure of the lip elements 3a, 3b, 13a, 13b is an important factor to determine good valve characteristics (seal characteristics, valve opening characteristics) of the valve bodies 3, 13. The higher the seal surface pressure gives the better the seal characteristics. The seal surface pressure becomes $$\text{seal surface pressure (kg/cm}^2\text{)} = \frac{\text{biasing force (kg) of spring}}{\text{(seal portion contact width (cm) of lip element)} \times \text{(peripheral length (cm) of lip element)}}$$

$$= \frac{\text{biasing force (kg) of spring}}{\text{(seal portion contact width (cm) of lip element)} \times \pi \times \text{(diameter (cm) of lip element)}}$$

When the shape of the valve body, i.e., diameter of the lip element or the contact width of the lip element with the seal portion, is the same, the seal surface pressure becomes higher as the biasing force of the spring becomes larger.

In such valve body, however, the valve opening must be performed at prescribed pressure. The biasing force of the spring has relation that spring biasing force (kg)=valve opening pressure (kg/cm$^2$)×pressure receiving area (cm$^2$).

Consequently, the above-mentioned formula becomes $$\text{seal surface pressure (kg/cm}^2\text{)} = \frac{\text{valve opening pressure (kg/cm}^2\text{)} \times \text{pressure receiving area (cm}^2\text{)}}{\text{(seal portion contact width (cm) of lip element)} \times \pi \times \text{(diameter (cm) of lip element)}}$$

The narrower the seal portion contact width of the lip element, the better the seal characteristics. However, the seal characteristics are limited by the durability and therefore becomes nearly constant in each seal member. Consequently, in the valve body where the diameter of the lip element and the valve opening pressure are set to contact valve, the valve body having the pressure receiving area can obtain the high seal surface pressure and prescribed valve opening characteristics so that good valve characteristics can be easily obtained.

Under consideration of the pressure receiving area, the caps 1, 11, will be studied where the valve bodies 3, 13, comprising the inner circumferential lip elements 3a, 13a, having the same diameter d and the outer circumferential lip elements 3b, 13b having the same diameter D are used, and the valve opening pressure is the same at the positive pressure state and the negative pressure state.

The pressure receiving area of the inner circumferential lip elements 3a, 13a will be studied.

The pressure receiving area X1 of the inner circumferential lip element 3a in the cap 1 becomes the annular area between the inner circumferential lip element 3a and the thin portion 3c since the inner circumferential lip element 3a is bent about the thin portion 3c as fulcrum. If the diameter of the thin portion 3c is made A, it follows that $$X1 = (A^2 - d^2)\pi/4$$

Since the pressure receiving area X2 of the inner circumferential lip element 13a in the cap 11 becomes the area surrounded by the inner circumferential lip element 13a, it follows that $$X2 = d^2 \cdot \pi/4$$

Comparing both pressure receiving areas X1, X2, if the diameter d is sufficiently small and less than $1/\sqrt{2}$ times of the diameter A, the pressure receiving area of the valve body 3 of the cap 1 becomes larger and therefore the cap 1 type can easily obtain good valve caracteristics at the negative pressure state.

Next, the pressure receiving area of the outer circumferential lip elements 3b, 13b will be studied.

Since the outer circumferential lip element 3b is bent about the thin portion 3c as fulcrum, the pressure receiving area Y1 of the outer circumferential lip element 3b in the cap 1 becomes the annular area between the outer circumferential lip element 3b and the thin portion 3c. That is $$Y1 = (D^2 - A^2)\pi/4$$

The pressure receiving area Y2 of the outer circumferential lip element 13b in the cap 11 becomes the area surrounded by the outer circumferential lip element 13b. That is $$Y2 = D^2 \cdot \pi/4$$

Comparing both pressure receiving areas Y1, Y2, it is clear that the valve body 13 of the cap 11 has larger pressure receiving area and therefore the cap 11 type can easily obtain good valve characteristics at the positive pressure state.

Consequently, the cap 1 type using the valve 3 where the inner and outer circumferential lip elements 3a, 3b are projected in reverse directions to each other is advantageous in that the pressure receiving area of the inner circumferential lip element 3a is made larger, but is disadvantageous in that the pressure receiving area of the outer circumferential lip element 3b is made smaller.

SUMMARY OF THE INVENTION

An object of the invention is to provide a cap with valve using a valve body with inner and outer circumferential lip elements projected in reverse directions to each other and acting in negative pressure state and positive pressure state, wherein pressure receiving area of the outer circumferential lip element can be made larger and good valve characteristics in the positive pressure state and the negative pressure state can be easily obtained.

The foregoing object is attained in a cap with valve wherein a valve body is annular and comprises an outher circumferential lip element projecting downward from an outer circumferential edge and an inner circumferential lip element projecting upward from an inner circumferential edge; a first support plate is arranged on upper side of the valve body and provided with a support member supporting the outer circumferential lip element from upper side of the valve body and biased downward by a first spring means; a second annular support plate is arranged on lower side of the valve body and provided with a support member supporting the inner circmferential lip element from lower side of the valve body and with a fluid flowing hole penetrating upper and lower surfaced at the center and biased upward by a second spring means; the outer circumferential lip elemet is pressed against an upper surface of an annular projection in a fluid flow path of the cap body; the inner circumferential lip element is pressed against a prescribed seal member; and the fluid flow path of the cap body is closed at normal state, characterized in that the first support plate is of nearly disk shape; a seal member of the inner circumferential lip element of the valve body is formed on the lower surface of the first support plate; and a fluid flowing hole penetrating the upper and lower surfaces is bored between the seal member and the support member in the first support plate.

In the cap with valve according to the invention constituted as above described, after being installed to an opening portion of a container, at normal state, the outer circumferential lip element of the valve body is pressed against the upper surface of the annular projection of the cap body, and the inner circumferential lip element of the valve body is pressed against the seal member at inside position in radial direction from the fluid flow path in the first support plate. Since these inner and outer circumferential lip elements are pressed at prescribed position, the fluid flow path in the cap body is closed by the valve body and the first support plate.

When pressure in the container becomes negative pressure of prescrived valve or more, the inner circumferentil lip element is bent about the support member of the first support plate as fulcrum supporting upper side of the outer circumferential lip element, and is lowered together with the second support plate against biasing force of the second spring means and separated from the seal member on the lower surface of the first support plate. Consequently, both fluid flowing holes of the first support plate and the second support plate communicate with each other through the gap, and the closed state of the fluid flow path of the cap body is released thereby the negative pressure state in the container is eliminated.

Also when the pressure in the container becomes positive pressure of prescrived valve or more, the outer circumferntial lip element is elevated togethr with the first support plate and the valve body as a whole against biasing force of the first spring means, and separated from the annular projection of the cap body. Consequently, the closed state of the fluid flow path of the cap body is released through the gap thereby the positive pressure state in the container is eliminated.

Since the inner circumferential lip element is bent about the support member of the first support plate as fulcrum, pressure receiving area of the inner circumferential lip element becomes the annular area between the inner circumferential lip element and the support member.

Since the outer circumferential lip element is moved together with the first support plate and the valve body as a whole including the inner circumferential lip element, however, pressure receiving area of the outer circumferential lip element becomes the circular area surrounded by the outer circumferential lip element. Consequently, being different from the annular area constituted by the area surrounded by the outer circumferential lip element with inside hollowed out as in a cap with valve in the prior art, the pressure receiving area of the outer circumferential lip element can easily made larger than that of the cap with valve in the prior art.

Consequently, in the cap with valve according to the invention, where the valve body having the inner and outer lip elements projected in reverse directions to each other is used and the cap with valve acts at negative pressure state and positive pressure state, even if the pressure receiving area of the inner circumferential lip element is made nearly equal to that of the cap with valve in the prior art, the pressure receiving area of the outer circumferential lip element can be made larger and good valve characteristics can be easily obtained at positive pressure state and negative pressure state.

DESCRIPTION OF THE PREFERRED EMBODIMENTS

Figure 1:
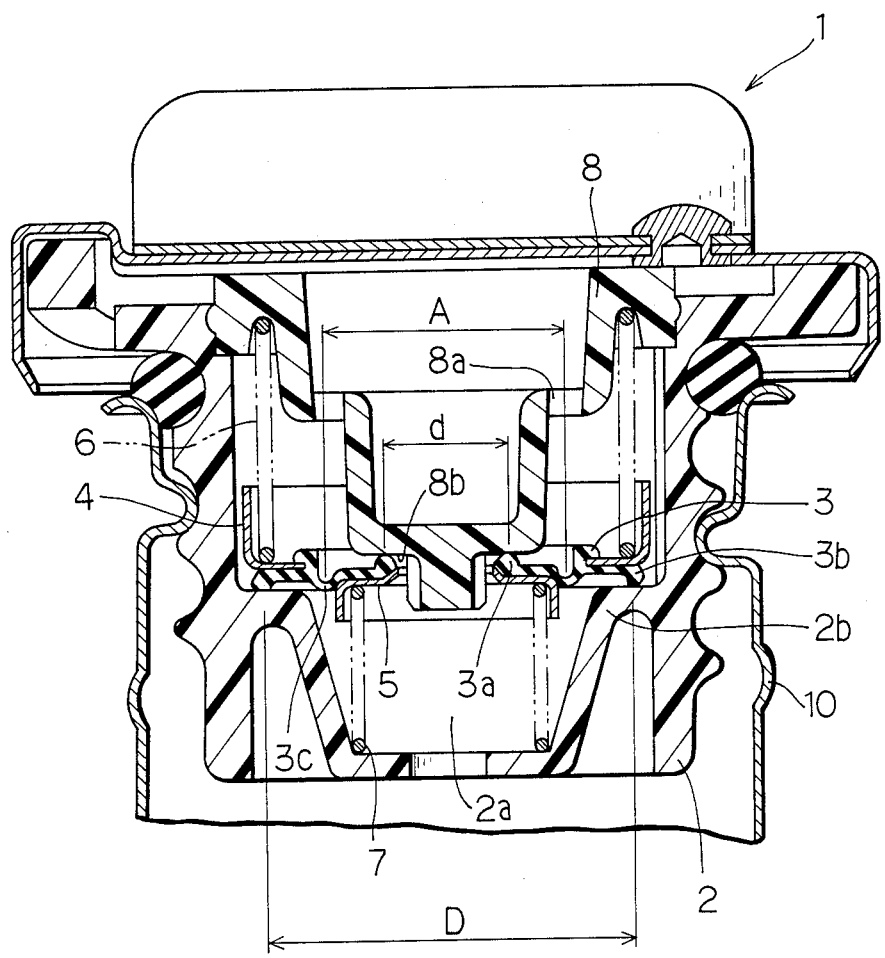
FIG. 1 is a sectional view of a cap as an example in the prior art.
Figure 2:
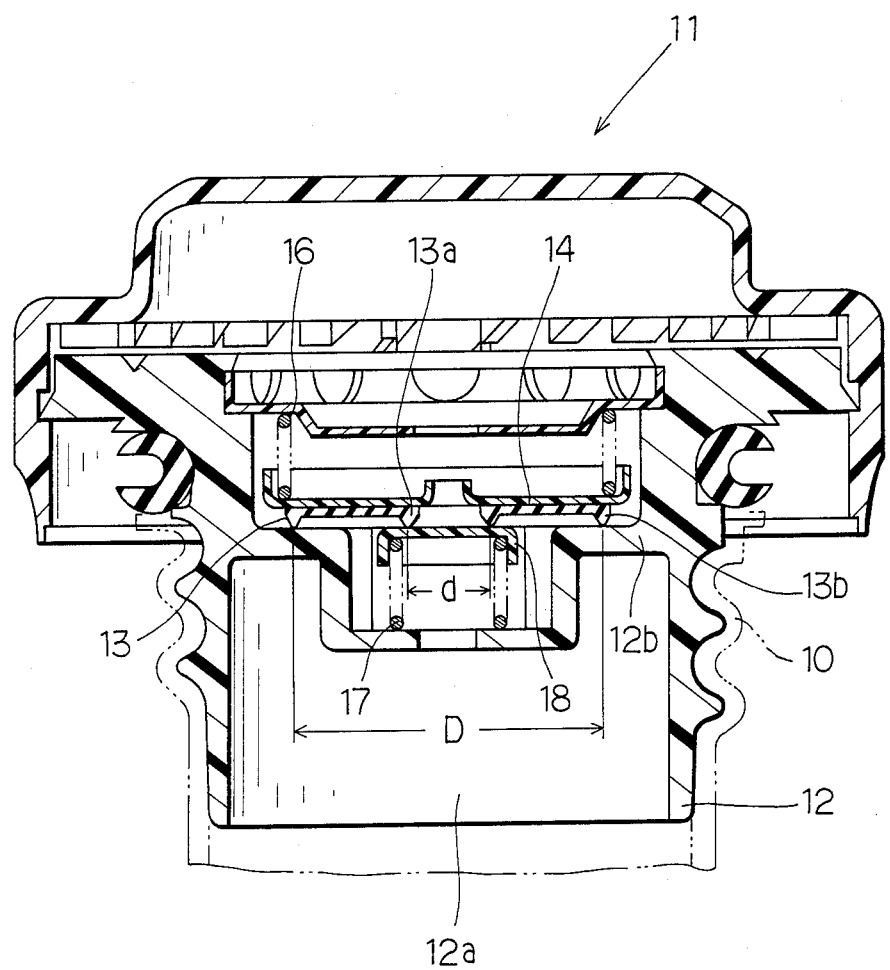
FIG. 2 is a sectional view of a cap as another example in the prior art.
Figure 3:
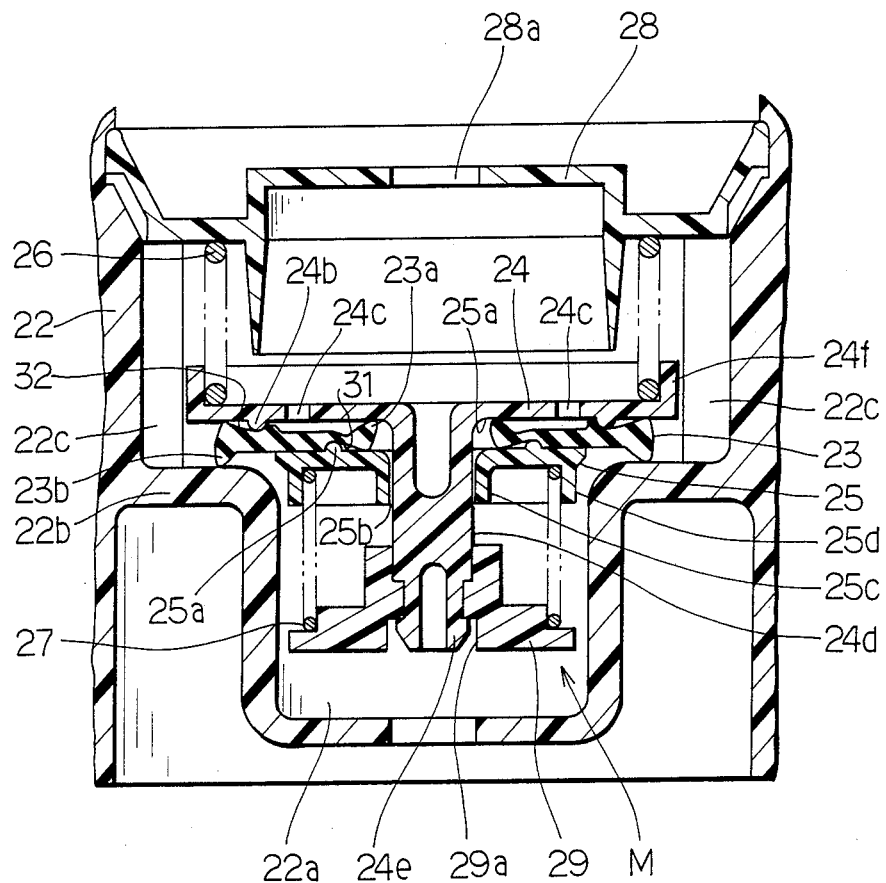
FIG. 3 is a an enlarged sectional view of a cap as an embodiment of the invention.

A cap 21 with valve of an embodiment shown in FIGS. 3~10 is a fuel neck to be installed in a filler neck of a fuel tank of automobiles in similar manner to the prior art. The cap 21 is composed of a cylider-shaped cap body 22 of plastics such as polyacetal, and a disk-shaped upper cover 42 of plastics such as nylon to be fitted to a flange portion 41 on upper end of the cap body 22. In order to prevent over tightening of the cap 21 to the filler neck 10, as known in the prior art, a ratchet projection 42a is formed at a lower surface of the upper cover 42, and an elastic finger (not shown) provided at its top end with a locking pawl 45 engageable with the ratchet projection 42a is formed on the flange portion 41 of the cap body. According to the elastic finger (not shouwn), a prescribed gap is provided between the outer circumference of the flange portion 41 of the cap body and the upper cover 42, and the fluid flow path 22a of the cap body 22 can communicate with air as hereinafter described.

A thread 43 for installing to the filler neck 10 is provided on the outer circumference of the cap body 22. Also on the outer circumference of the cap body 22, a seal ring 44 is installed outward to the lower surface of the flange portion 41.

The flow path 22a for fluid such as air in the tank is formed within the cap body 22. An annular projection 22b projecting inward in radial direction is formed on the inner circumference of the fluid flow path 22a. Numeral 22c designates a plurality of ribs installed on the inner circumference of the fluid flow path 22a in order to guide movement in a first support plate 24 at positive pressure operation state as hereinafeter described.

Also in the fluid flow path 22a, a valve body 23, a first support plate 24, a second support plate 25, a first coil spring 26, a second coil spring 27 and spring shoe plates 28, 29 are arranged.

Figure 4:
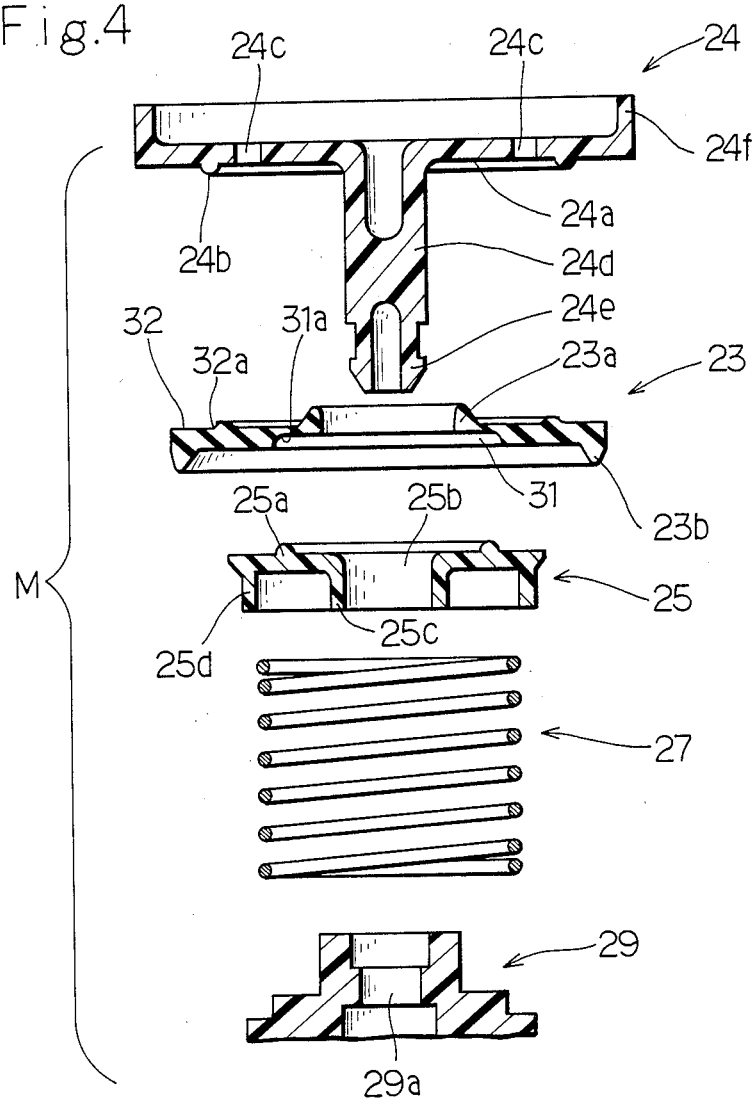
FIG. 4 is a an exploded sectional view of a valve mechanism assembly in the embodiment.
Figure 6:
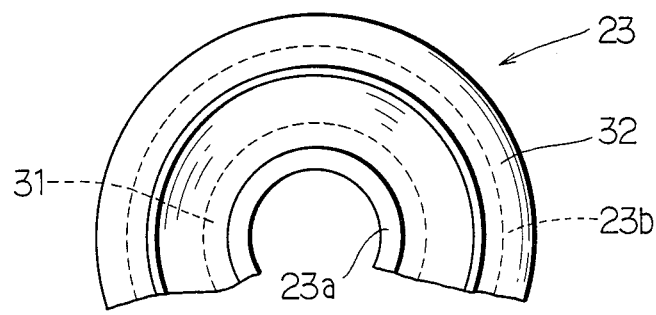
FIG. 6 is a partial plan view of a valve body to be used in the embodiment.

The valve body 23 is an annular body made of rubber or rubber-like elastic material such as thermoplastic elastomer. The valve body 23 as shown in FIG. 4, FIG. 6, comprises an inner circumferential lip element 23a projecting upward at the inner circumferential edge, and an outer circumferential lip element 23b projecting downward at the outer circumferential edge. Outer diameter of the outer circumferential lip element 23b is specified so that the outer circumferential lip element 23b can be pressed against the upper surface of the annular projection 22b of the cap body 22. Also inner diameter of the inner circumferential lip element 23a has dimension so that when the outer circumferential lip element 23b is pressed against the upper surface of the annular projection 22b, the inner circumferential lip element 23a is positioned inside the annular projection 22b. On the inner circumferential edge at lower surface side of the inner circumferential lip element 23a in the valve body 23 is formed an annular recess 31 at dimension larger than width of the inner circumferential lip element 23a. Also on the outer circumferential edge at upper surface side of the outer circumferential lip element 23b in the valve body 23 is formed an annular recess 32 at dimension larger than width of the outer circumferential lip element 23b.

Figure 5:
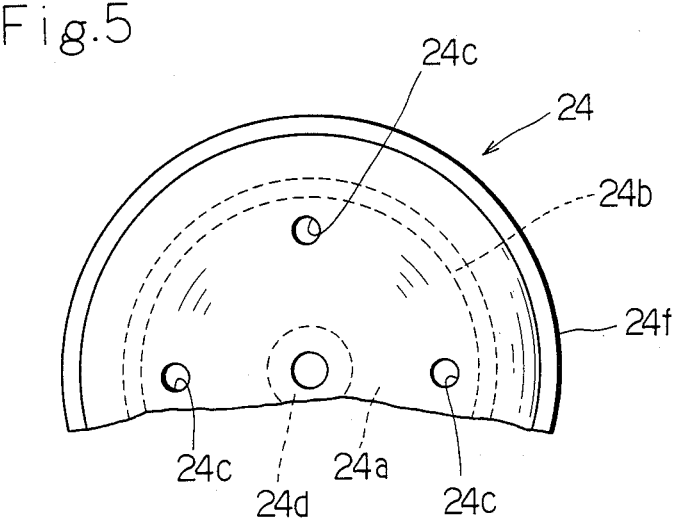
FIG. 5 is a partial plan view of a first support plate to be used in the embodiment.

The first support plate 24 is a disk-shaped body made of plastics such as polyacetal, and its outer diameter is slightly larger than the valve body 2. The first support plate 24 is provided at a lower surface with a seal member 24a against which the inner circumferential lip element 23a of the valve body 23 is pressed. Also at the lower surface of the first support plate 24, as shown in FIG. 4, FIG. 5, an annular support member 24b is fitted corresponding to a bottom portion 32a at inside in radial direction in the annular recess 32 of the outer circumferential edge of the valve body 23, and is projected to support the upper surface side of the outer circumferential lip element 23b of the valve body 23. A plurality of fluid flowing holes 24c penetrating the upper and lower surfaces are bored between the seal member 24a and the support member 24b.

Further at the center of the lower surface of the first support plate 24, a shaft portion 24d with outer diameter smaller than the inner diameter of the inner circumferential lip element 23a of the valve body 23 is projected downward. A swelled portion 24e whose outer diameter can be compressed and deformed in spring elasticity is provided at the lower end of the shaft portion 24d so as to engage a spring shoe plate 29 as hereinafter described.

An annular projection 24f projecting upward at the outer circumferential edge on the upper surface of the first support plate 24 is formed so as to guide a first coil spring 26 as hereinafter described.

Figure 7:
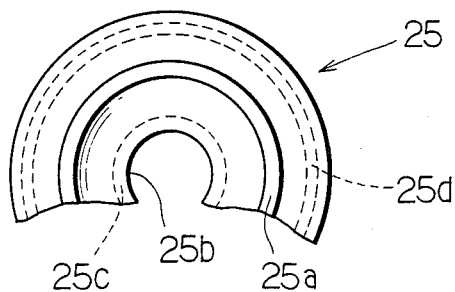
FIG. 7 is a partial plan view of a second support plate to be used in the embodiement.

The second support plate 25 is an annular body made of plastics such as polyacetal. Outer diameter of the second support plate 25 is nearly equal to or slightly less than the inner diameter of the annular projection 22b of the cap body 22, and inner diameter thereof is larger than the outer diameter of the shaft portion 24d of the first support plate 24. At the upper surface of the second support plate 25, as shown in FIG. 4 FIG. 7, an annular support member 25a is fitted corresponding to a bottom portion 31a at outside in radial direction in the annular recess 31 of the inner circumferential edge of the valve body 23, and is projected to support the lower surface side of the inner circumferential lip element 23a of the valve doby 23. The hole at the center of the second support plate 25 is a fluid flowing hole 25b, and a projection 25c projecting downward is formed at the inner circumferential edge of the fluid flowing hole 25b. The projection 25c is formed so as to guide the valve body 23 being lowered along the shaft portion 24d of the first support plate 24 at negative pressure operation of the valve body 23 as hereinafter described. Also a projection 25d is formed so as to guide a second coil spring 27 as hereinafter described.

The spring shoe plate 29 to be engaged with the shaft portion 24d of the first support plate 24 is made of plastics such polyacetal. The spring shoe plate 29 is an annular body provided at the center with a locking hole 29c engageable with the swelled portion 24e at the lower end of the shaft portion 24d. At assembling state to the shaft portion 24d, the spring shoe plate 29 holds the lower end of the second coil spring 27 interposed between the spring shoe plate 29 and the second support plate 25.

The second coil spring 27 biases the second support plate 25 upward, and presses the inner circumferential lip element 23a of the valve body 23 against the seal member 24a of the first support plate 24 through the support member 25a of the second support plate 25.

The spring shoe plate 28 is provided at the center with a fluid flowing hole 28a and made of plastics such as polyacetal. The spring shoe plate 28 is arranged in the fluid flow path 22a of the cap body 22 on upper side of the first support plate 24, and holds the upper end of the first coil spring 26 biasing the first support plate 24 downward.

The first coil spring 26 biases the first support plate 24 downward, and presses the outer circumferential lip element 23b of the valve body 23 against the annular projection 22b of the cap body 22 through the support member 24b of the first support plate 24.

Assembling of each of these members to the cap body 22 will be described.

First, the bottom portion 32a of the valve body annular recess 32 is fitted to the support member 24b at the lower surface of the first support plate 24, and the support member 25a at the upper surface of the second support plate 25 is fitted to the bottom portion 31a of the valve body annular recess 31. And then the second coil spring 27 is arranged at the lower surface of the second support plate 25, and the spring shoe plate 29 holding the lower end of the second coil spring 27 is engaged with the shaft portion 24d of the first support plate 24. Thus valve mechanism assembly M composed of the valve body 23, the first and second support plates 24,25, the second coil spring 27 and the spring shoe plate 29 is formed. In the valve mechanism assembly M, the support members 24b, 25a of the first and second support plates are fitted to the annular recess bottom portions 31a,32a, of the valve body 23. Consequently, the inner and outer circumferential lip elements 23a,23b of the valve body 23 are assembled to the first and second support plates 24, 25 without eccentricity.

The valve mechanism assembly M is arranged within the fluid flow path 22a of the cap body so that the outer circumferential lip element 23b is disposed at the upper surface of the annular projection 22b. And then the first coil spring 26 is disposed at the upper surface of the first support plate 24, and the spring shoe plate 28 holding the upper end of the first coil spring 26 is disposed within the fluid flow path 22a of the cap body 22. Further the prescribed upper cover 42, the seal ring 44 and the like are assembled thereby the cap body 21 of the embodiment can be constituted.

After the cap 21 is installed to the filler neck 10, at normal state, the outer circumferential lip element 23b of the valve body 23 is pressed against the upper surface of the annular projection 22b of the cap body 22 through the support member 24b of the first support plate 24 by the first coil spring 26. Also the inner circumferential lip element 23a of the valve body 23 is pressed against the seal member 24a of the first support plate 24 through the support member 25a of the second support plate 25 by the second coil spring 27. Since the fluid flowing hole 24c of the first support plate 24 is closed between the inner and outer circumferential lip elements 23a, 23b of the valve body 23, the fluid flow path 22a on upper side of the annular projection 22b is closed by the valve body 23 and the first support plate 24.

Figure 8:
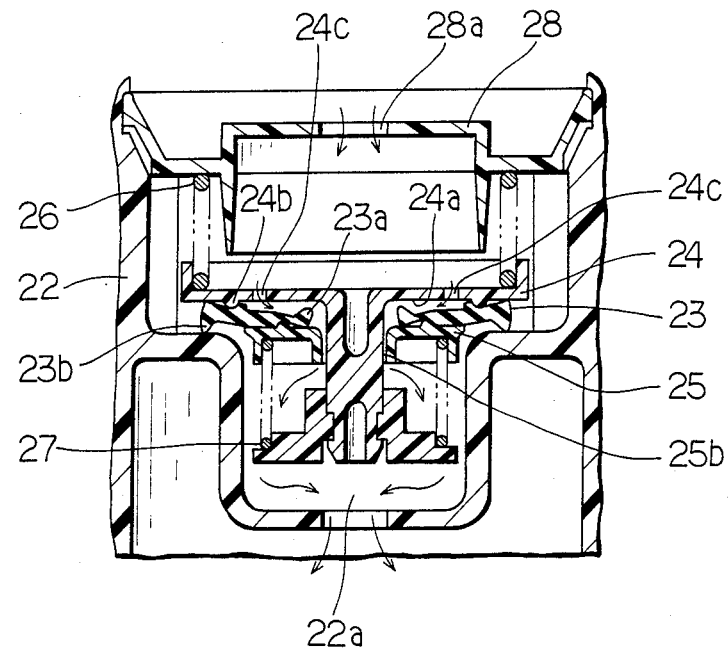
FIG. 8 is a partial sectional view illustrating operation state at negative pressure state in the embodiment.

When pressure within the tank becomes negative pressure of prescribed valve or more, as shown in FIG. 8, the inner circumferential lip element 23a is bent downward about the support member 24b of the first support plate 24 as fulcrum supporting the upper surface side of the outer circumferential lip element 23b. That is, the inner circumferential lip element 23a together with the second support plate 25 is lowerd against the biasing forse of the second coil spring 27, and separated from the seal member 24a at the lower surface of the first support plate 24. Consequently, fluid such as air passes through the gap and flows into the tank through the fluid flowing hole 28a of the spring shoe plate 28, the fluid flowing hole 24c of the first support plate 24 and the fluid flowing hole 25b of the second support plate 25, thereby the negative pressure state within the tank is eliminated.

Figure 9:
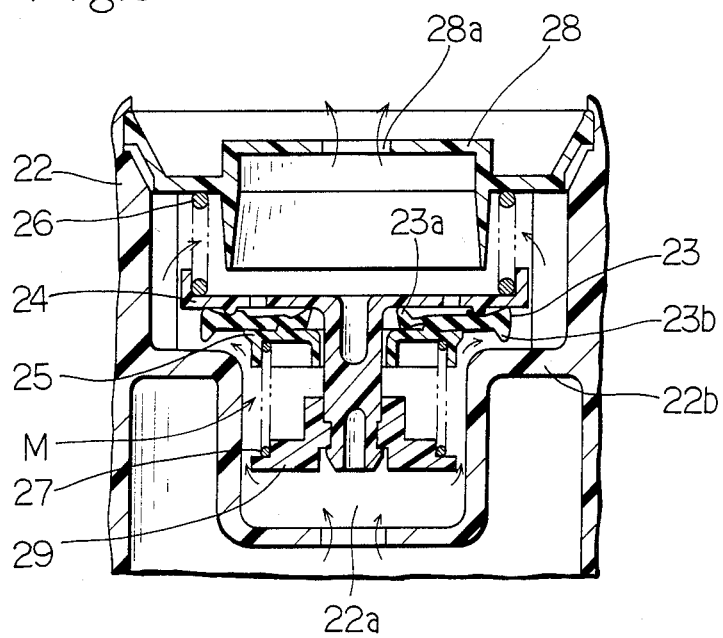
FIG. 9 is a partial sectional view illustrating operaton state at positive pressure state in the embodiment.
Figure 10:
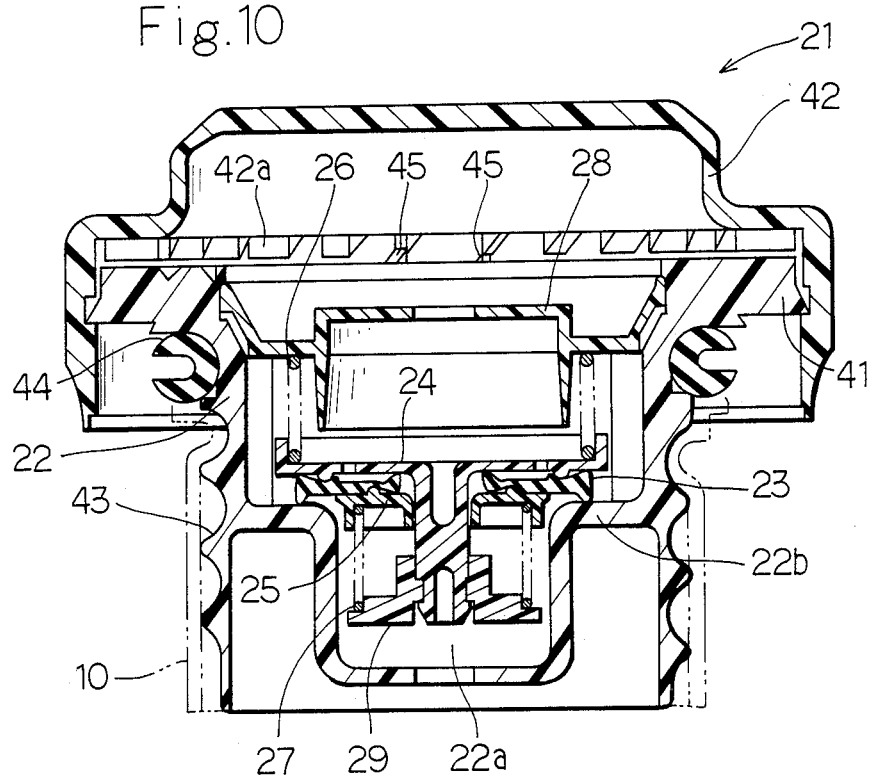
FIG. 10 is a sectional view of the embodiment.

Also when the pressure within the tank becomes positive pressure of prescribed valve or more, as shown in FIG. 9, the outer circumferential lip element 23a is elevated together with the first support plate 24 and the valve mechanism assembly M as a whole against the biasing force of the first coil spring 26, and separated from the upper surface of the annular projection 22b of the cap body 22. Consequently, the closed state of the fluid flow path 22a of the cap body 22 is released by the gap and fluid such as air flows out of the tank, there by the positive pressure state within the tank is eliminated.

Since the inner circumferential lip element 23a is bent about the support member 24b of the first support plate 24 as fulcrum, pressure receiving area of the inner circumferential lip element 23a at negative pressure state becomes the annular area between the inner circumferential lip element 23a and the supprt member 24b.

Since the outer circumferential lip element 23b is elevated together with the valve body 23, the first support plate 24 and the vlve mechanism assembly M as a whole, however, pressure receiving area of the outer circumferential lip element 23b at positive pressure state becomes the circular area surrounded by the outer circumferential lip element 23b. Being different from the annular area of the cap 1 of the prior art as shown in FIG. 1 where inside of the area surrounded by the outer circumferential lip element 3b is hollowed out, the pressure receiving area of the invention becomes larger than that of the prior art.

Consequently, in the cap 21, when the inner and outer diameters of the valve body 23 are made equal respectively to the inner and outer diameters of the prior art, even if the pressure receiving area of the inner circumferential lip element 23a acting at negative pressure state is made equal to that of the prior art, the pressure receiving area of the outer circumferential lip element acitng at positive pressure state can be made larger securely thereby good valve characteristics at positive pressure state and negative pressure state can be easily obtained.

Further in the cap 21 of the embodiment, valve mechanism assembly M composed of the valve body 23, the first and second support plates 24, 25, the second coil spring 27 and the spring shoe plate 29 is previously assembled, and the valve mechanism assembly M is assembled with the cap body 22. Since various small parts are not assembled one by one to the large cap body as in the case of the cap 1 in the prior art, the assembling work becomes efficient.

Figure 11:
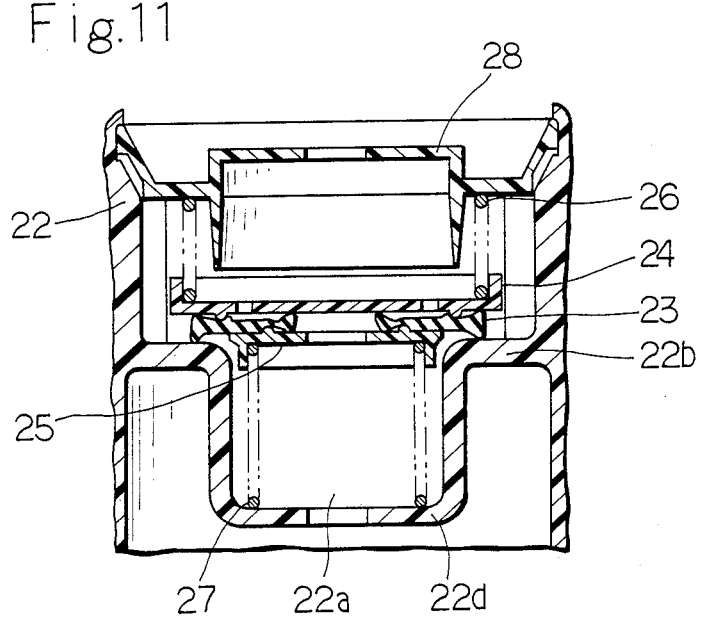
FIG. 11 is a partial sectional view of a cap as still another embodiment.

Of course, when the valve mechanism assembly M is not constituted but the lower end of the second coil sprring 27 biasing the second support plate 25 upward is held to a spring shoe 22d at the lower end of the annular projection 22b of the cap body 22 as shown in FIG. 11, the object of the invention can be attained.

Further in the cap 21 of the embodiment, the annular recesses 31, 32 are provided at the inner and outer circumferential edges of the valve body 23, and the support members 24b, 25a of the first and second support plates 24, 25 are fitted to the bottom portions 31a, 32a of these recesses 31, 32 for the assembling. Consequently, the inner and outer circumferential lip elements 23a, 23b of the valve body 23 can be assembled respectively to the first and second supprot plates 24,25 easily without eccentricity, thereby the assembling work is efficient. Of course, this fitting state is similar also in the case that projections are provided at side of the valve body 23, and recesses for supporting these projections in fitting state are provided on the first and second support plates 24, 25.

Figure 12:
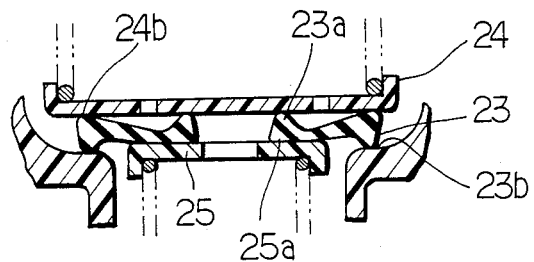
FIG. 12 is a partial sectional view of a cap as still another embodiment.

Of course, as shown in FIG. 12, the valve body 23 is not provided with the annular recesses 31, 32 but opposide surfaces in the inner and outer circumferential lip elements 23a, 23b are made flat, and the first and second support plates 24,25 may not be provided with the support members 24b, 25a projecting. That is, the valve body 23 is provided with the inner and outer circumferential lip elements 23a, 23b projecting in upward and downward directions respectively. Consequently, if the first support plate 24, the valve body 23 and the second support plate 25 are arranged in sequence from upper side and the prescribed first coil spring 26 and the second coil spring 27 are arranged, the abutting on the first and second support plates 24, 25 is effected always at opposite positions of the inner and outer lip elements 23a, 23b.

Consequently, the abutting positions become the support members 24b, 25a. In this constitutions, although troublesome work is required for the assembling so as to prevent eccentricity the object of the invention can be attained even if the valve body 23 is not provided with the annular recesses 31, 32 and the first and second support plates 24, 25 are not provided with the support members 24b,25a projecting. In this case, the valve body 23 may be bonded in the support members 24b, 25a.

Further in the cap 21 of the embodiment, the annular recesses 31, 32 are provided at the inner and outer circumferential edges of the valve body 23, and the support members 24b, 25a of the first and second support plates 24, 25 are fitted to the bottom portions 31a, 32a of these annular recesses 31, 32. That is, when the inner circumferential lip element 23a is not pressed against the seal member 24a a gap is produced between the lower surface of the inner circumferential lip element 23a and the second support plate 25, and when the outer lip element 23b is not pressed against the annular projection 22b a gap is produced between the upper surface of the outer circumferential lip element 23b and the first support plate 24. Consequently, the inner and outer circumferential lip elements 23a, 23b are liable to be bent in upward and downward directions on account of the gap, and even if the surface precision (undulation precision) of the seal surface against which each of the lip element 23a,23b is to be pressed is not sufficient the error in the surface precision of the seal surface can be absorbed by the gap. In other words, the seal member 24a of the first support plate 24 or the upper surface of the annular projection 22b of the cap body 22 can be easily manufactured.

What is claimed is:

1. A cap with valve comprising:
   (a) a cap body installed at an opening portion a container and provided with a fluid flow path and an annular projection projecting inward at an inner circumference of said fluid flow path;
   (b) an annular valve body provided with an inner circumferential lip element projecting upward at inner circumferential edge and an outer circumferential lip element projecting downward at outer circumferential edge, said inner circumferential lip element being positioned at inside of the annular projection of the cap body and said outer circumferential lip element being capable of abutting on an upper surface of the annular projection of the cap body;
   (c) a first disk-shaped support plate arranged at upper side of said valve body and provided at a lower surface with a seal member of the inner circumferential lip element of the valve body and with a support member supporting the outer circumferential lip element of the valve body from upper side of the valve body and provided with a fluid flowing hole penetrating the upper and lower surfaces between the seal member and the support member;

(d) a first spring means arranged within the fluid flow path of said cap body at upper side of said first support plate and biasing the first supprt plate downward;

(e) a second annular support plate arranged at lower side of the valve body and at inside of the annular projection of the cap body and provided at an upper surface with a support member supporting the inner circumferential lip element of the valve body from lower side of the valve body, and at the center with a fluid flowing hole penetrating the upper and lower surface; and (f) a second spring means arranged within the fluid flow path of the cap body at lower side of said second support plate and biasing the second support plate upward.

2. A cap with valve as set forth in claim 1, wherein annular recesses are formed respectively on inner circumferential edge at lower surface side of the inner circumferential lip element and on outer circumferential edge at upper surface side of the outer circumferential lip element in the valve body;

the support member of the first support plate is formed in annular projection so as to be fitted to the bottom portion of the annular recess at upper surface side of the outer lip element of the valve body; and the support member of the second support plate is formed in annular projection so as to be fitted to the bottom portion of the annular recess at lower surface side of the inner circumferential lip element of the valve body.

3. A cap with valve as set forth in claim 1, wherein a shaft member is projected from the center of the lower surface of said first support plate and inserted in the valve body and the second support plate;

a spring shoe plate is locked to the lower end of said shaft portion and holds the second spring means biasing the second support plate upward; and valve mechanism assembly composed of the first support plate, the valve body, the second support plate, the second spring means and the spring shoe palte is assembled integrally.

4. A cap with valve as set forth in claim 3, wherein annular recesses are formed respectively on inner circumferential edge at lower surface side of the inner circumferential lip element and on outer circumferential edge at upper surface side of the outer circumferential edge element in the valve body;

the support member of the first support plate is formed in annular projection so as to be fitted to the bottom portion of the annular recess at upper surface side of the outer lip element of the valve body; and the support member of the second support plate is formed in annular projection so as to be fitted to the bottom portion of the annular recess at lower surface side of the inner cirfumferential lip element of the valve body.

* * * * *